July 23, 1946.  R. D. NANTZ  2,404,590
HEAT CONCENTRATING NOZZLE PROTECTOR FOR HEATING,
CUTTING, AND WELDING TORCHES, AND THE LIKE
Filed April 20, 1943
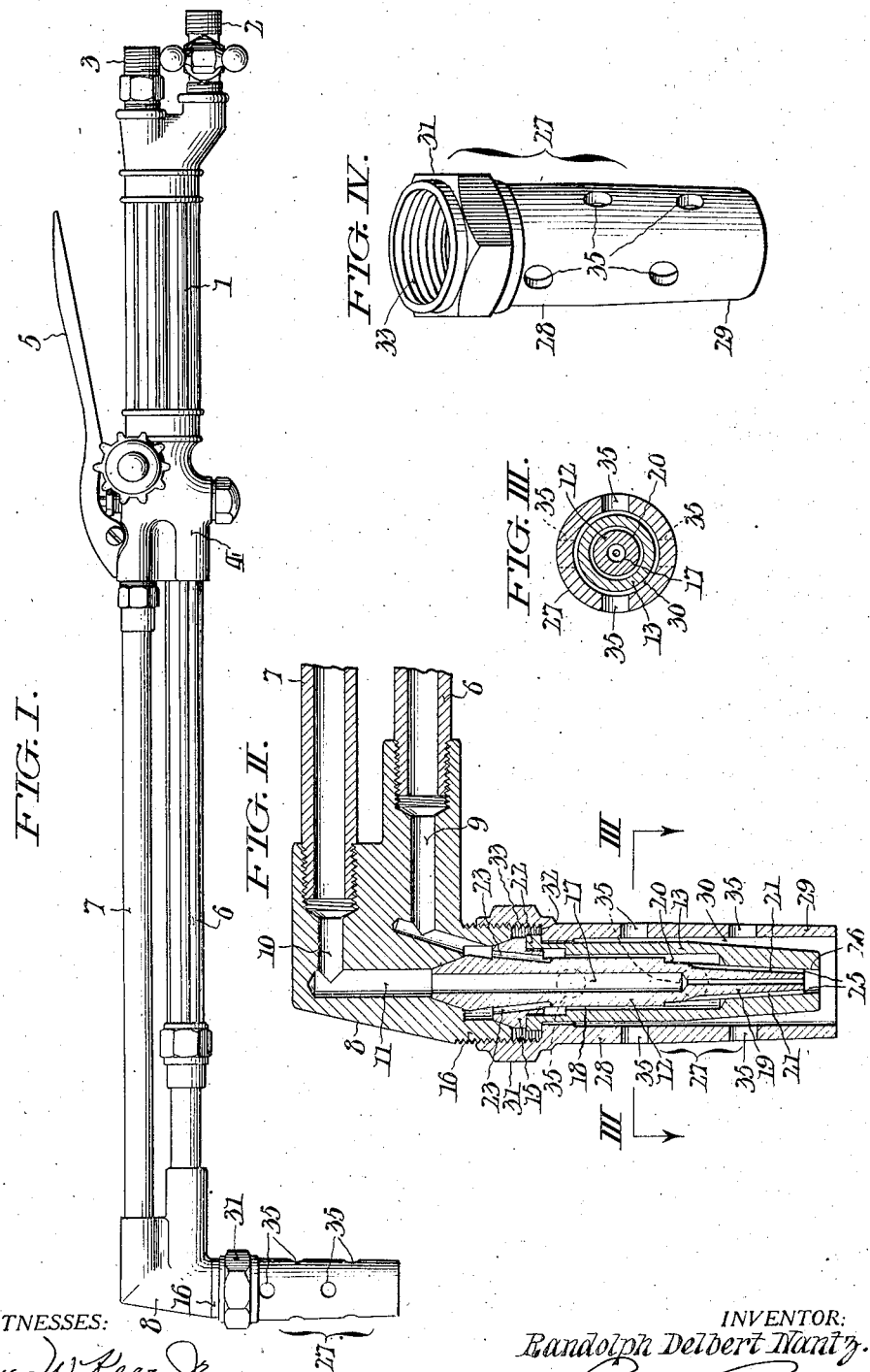
INVENTOR:
Randolph Delbert Nantz,
BY
ATTORNEYS.

Patented July 23, 1946

2,404,590

UNITED STATES PATENT OFFICE 2,404,590

HEAT CONCENTRATING NOZZLE PROTECTOR FOR HEATING, CUTTING, AND WELDING TORCHES, AND THE LIKE

Randolph Delbert Nantz, Orange, Tex.

Application April 20, 1943, Serial No. 483,722

2 Claims. (Cl. 158—27.4)

This invention relates to heat concentrating nozzle protectors useful in connection with welding torches and the like.

The nozzles of welding torches are delicately formed with multiple minute discharge outlets at their tips at which a combustible mixture of acetylene, propane, natural gas, or the like and oxygen is forcibly projected; and are usually constructed from relatively soft non-corrosive metal such as brass, copper or bronze. Through rough handling of the torches in use, the nozzle tips are very often dented or otherwise damaged, with resultant distortion of the discharge orifices, which for correction, ordinarily entails entire replacement of the nozzle parts at considerable cost and delay. Moreover, in heating, cutting and welding, the nozzle orifices invariably become clogged by flying rust, scale and dirt from the metal being burned or welded, so that frequent disassembling and cleaning is required for maintenance of the torches in efficient working condition.

The chief aim of my invention is to obviate the above drawbacks. This desideratum I attain in practice as hereinafter more fully disclosed, through provision of a simple and inexpensive heat concentrating nozzle protector in the form of a tube of steel or other relatively hard metal or material, which is securable to the torch and completely surrounds the nozzle tip, being somewhat larger in diameter than said tip to form an annular interval around the latter, and having apertures or ports at intervals of its length so that air may enter into and be drawn down toward the burning end of the nozzle through said interval under the suction created by the flame blast, to divert flying rust, scale and/or dirt from the metal being burned or welded away from the nozzle tip, and at the same time concentrate the heat of the flame at the nozzle tip.

A further aim of my invention is to secure the above advantages in a heat concentrating protector which acts in the further capacity as a means to hold the component parts of the nozzle assembled with the torch.

Other objects and attendant advantages will appear from the following detailed description of the attached drawing, wherein Fig. I is a view in side elevation of a well known and widely used type of oxy-acetylene cutting torch embodying the heat concentrating nozzle protector of my invention.

Fig. II is a fragmentary view in longitudinal section of the burner tip end of the torch with the heat concentrating nozzle protector in place.

Fig. III is a cross-section taken as indicated by the angled arrows III—III in Fig. II; and Fig. IV is a perspective view of the heat concentrating nozzle protector detached from the torch.

The welding torch illustrated in Fig. I for convenience of exemplification herein has a grasp handle 1 with separate longitudinal flow ducts or channels (not shown) for acetylene or other inflammable gas, and oxygen delivered under pressure through supply tubes (not shown) for the connection of which nipples 2 and 3 are provided at the rear end of said handle. Integral with the handle 1 at the forward end thereof is the body 4 of a valve, the stem of which is operable by means of an overlying press lever 5 to concurrently control the flow of the oxygen incident to the use of the torch. Leading from the front end of the valve body 4 are two parallel pipes 6 and 7 by which the acetylene and the oxygen are conducted to the nozzle head 8 of the torch, said pipes communicating by way of passages 9 and 10 with the vertical bore 11 of said head. The nozzle of the torch is of multipartite construction, i. e., consists of an inner core piece or jet component 12, and an outer or enclosing tapering shell component 13. Somewhat below its top the jet component 12 has an integral circumferential enlargement or collar 15 whereof the upwardly-tapering end snugly fits into a correspondingly-tapered seat at the mouth of the pendant externally threaded neck 16 of the head. Extending axially through the jet component 12 of the nozzle is a duct 17 through which the oxygen passes downward from the hollow of the head 8 to the nozzle tip. Below the enlargement or collar 15, the jet component 12 is first diametrically reduced as at 18 and then tapered as at 19, with resultant provision of an annular gas flow passage 20 between it and the shell component 13, the tapered portion being fluted as at 21. At the top the shell component 13 is formed with an external circumferential flange 22 which abuts the bottom or shoulder of the collar 15 on the jet component 12, said shell component being cylindric except toward its bottom where it is tapered to conform more or less to the shape of the lower end of said jet component. After entry into the nozzle head 8, the acetylene gas passes down through a series of small circumferentially arranged substantially vertical ducts 23 in the collar 15 of the jet component 12 into the annular space 20, and finally through the small restricted orifices 25 at the tip end of the nozzle jointly formed by the fluting 20 of said jet component and the contiguous wall of an axial opening 26 at the bottom of the shell component 13, to meet with the oxygen issuing from the discharge end of the duct 17.

Having now briefly set forth the construction of the torch, I will describe the heat concentrating nozzle protector with which my invention is more especially concerned, the same being comprehensively designated by the numeral 27, in the drawing.

As shown, this protector is in the form of a tube with a cylindric bore, which, in practice, is fashioned from a relatively hard material or metal, preferably steel, and shaped to approximate the outside configuration of the shell component 13 of the torch nozzle, that is to say, made with its upper portion 28 cylindric, and with its lower portion 29 slightly tapered. It is to be noted that the protector 27 extends to a substantial distance beyond the nozzle tip, and that its internal dimension is slightly larger than the outer dimensions of the shell component 13 of the nozzle so that a coextensive narrow outwardly-flaring annular inter-space 30 is provided between said tube and sleeve component. At its upper end the protector 27 has a polygonal enlargement 31 for wrench application, with a circumferential internal shoulder 32, which, see Fig. II, bears upward against the flange 22 of the shell component 13 thereby to hold the latter and the jet component 12 assembled with the torch. As shown in Figs. II and III the enlarged upper end of the protector 27 is internally threaded at 33 for the purpose of screw engagement with the pendent threaded neck 16 of the nozzle head 8. At suitable intervals longitudinally and circumferentially, the body portion of the protector 27 is provided with apertures 35 through which air is drawn by the suction created by the flame blast at the nozzle from the exterior into the interval 30 for discharge eventually at the burning end of the nozzle. This discharge rush of air annularly of the nozzle operates not only to blow rust or scale and dirt from the metal being burned or welded to prevent entering and clogging the jet orifices of said nozzle, but as a screen around the flame to concentrate the heat at the nozzle tip. The protector 27 moreover serves as a means to hold the nozzle parts in position on the torch by virtue of taking the place of a nut (not shown) which ordinarily serves in that capacity.

From the foregoing it will be seen that the heat retaining nozzle protector of my invention is not only simple and inexpensive to produce in quantity, but applicable to standard types of welding torches without necessitating any structural changes in them or requiring any modification in their normal mode of operation.

Having thus described my invention, I claim:

1. A tubular heat concentrating protector for a welding torch or the like having a nozzle head with a threaded neck, and a nozzle with a circumferential flange at one end, said protector being substantially co-extensive with and completely surrounding the nozzle with attendant formation of an intervening annular air space, having air inlet ports at longitudinal intervals, an internal circumferential shoulder adjacent its top to bear against the flange of the nozzle component, and being there internally threaded for screw engagement with the threads of the nozzle head.

2. A tubular heat concentrating protector for use with a welding torch or the like having a nozzle head with a threaded neck, and a nozzle including a jet component with a circumferential enlargement at one end thereof fitting into the neck, and a surrounding tapering shell component with a flange at one end to bear against the circumferential enlargement of the jet component, said protector being substantially co-extensive with and completely surrounding the nozzle with attendant formation of an outwardly-flaring intervening annular air space, having air inlet apertures at longitudinal intervals, an internal circumferential shoulder adjacent its top to bear against the flange of the sleeve component of the nozzle, and being there internally threaded for screw engagement of the neck of the nozzle head to hold the nozzle parts assembled with the torch.

RANDOLPH DELBERT NANTZ.